(12) United States Patent
Garlock et al.

(10) Patent No.: US 11,622,166 B2
(45) Date of Patent: Apr. 4, 2023

(54) CAMERA ASSEMBLY AND METHOD FOR ASSEMBLING

(71) Applicant: Robert Bosch GmbH, Stuttgart (DE)

(72) Inventors: Steven E. Garlock, Quarryville, PA (US); Kevin S. Zutell, Landisville, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/384,474

(22) Filed: Jul. 23, 2021

(65) Prior Publication Data

US 2023/0026043 A1   Jan. 26, 2023

(51) Int. Cl.
H04N 5/225 (2006.01)
H04N 23/54 (2023.01)
H04N 23/51 (2023.01)

(52) U.S. Cl.
CPC ............ *H04N 23/54* (2023.01); *H04N 23/51* (2023.01)

(58) Field of Classification Search
None
See application file for complete search history.

(56) References Cited

U.S. PATENT DOCUMENTS

| | | | |
|---|---|---|---|
| 4,945,367 A | 7/1990 | Blackshear | |
| 6,268,882 B1 | 7/2001 | Elberbaum | |
| 6,850,025 B1 * | 2/2005 | Paolantonio | G08B 13/1963 318/599 |
| 7,217,045 B2 | 5/2007 | Jones | |
| 7,364,128 B2 | 4/2008 | Donaldson et al. | |
| D568,361 S | 5/2008 | Arnold et al. | |
| 7,570,481 B2 | 8/2009 | Seff et al. | |
| 8,480,317 B2 | 7/2013 | Wang et al. | |
| 8,506,181 B2 | 8/2013 | Mukai | |
| 8,878,930 B2 | 11/2014 | Hakoishi | |
| 9,578,291 B2 | 2/2017 | DiPoala | |
| 9,930,227 B2 | 3/2018 | Pfiffi | |
| 9,998,701 B2 | 6/2018 | Wada et al. | |
| 10,248,008 B2 | 4/2019 | Mitchell et al. | |
| 10,341,570 B1 | 7/2019 | Kong et al. | |
| 10,447,938 B2 | 10/2019 | Ekbladh et al. | |
| 10,516,224 B1 * | 12/2019 | Taylor | H05K 1/0243 |
| 10,953,555 B2 * | 3/2021 | Altman | H02J 7/0045 |
| 2010/0060747 A1 * | 3/2010 | Woodman | H04N 23/531 348/222.1 |

(Continued)

FOREIGN PATENT DOCUMENTS

WO   WO-2019067643 A1 *   4/2019   ........... F16M 11/041

*Primary Examiner* — Cynthia Segura
(74) *Attorney, Agent, or Firm* — Michael Best & Friedrich LLP

(57) ABSTRACT

A method for assembling a camera includes providing an upper housing having a first circuit board and a lower housing having a second circuit board having an image sensor fixed thereon. The first circuit board includes a first blind mate connector on a lower surface thereof. The method further includes providing a second blind mate connector. The lower housing is moved toward the upper housing to a first connected state in which the lower housing is supported by the upper housing and the first and second blind mate connectors are partially coupled. The lower housing is further moved toward the upper housing to a second connected state in which the first and second blind mate connectors are fully coupled.

20 Claims, 9 Drawing Sheets

(56) References Cited

U.S. PATENT DOCUMENTS

2011/0286735 A1* 11/2011 Tremblay ................. H04N 5/33
                                                         396/535
2015/0316836 A1    11/2015 Lewin et al.
2020/0236262 A1*   7/2020 Moncino ................ F16M 11/14
2020/0332982 A1   10/2020 Wassel

* cited by examiner

CAMERA ASSEMBLY AND METHOD FOR ASSEMBLING

BACKGROUND OF THE INVENTION

A camera assembly used for surveillance can contain a camera and one or more circuit boards that, for example, support an image sensor for capturing an image and/or a microphone for recording audio. Additionally, the circuit boards include various components for controlling data transfer, regulating power supply, and controlling movement (pan, tilt, zoom) of the camera assembly. In some camera assemblies, such as ceiling-mounted camera assemblies or pole-mounted camera assemblies, the desired field of view is generally below the camera assembly such that placement of the circuit boards is generally above the camera and between the camera and the structure to which the camera assembly is mounted.

SUMMARY OF THE INVENTION

The invention provides, in one aspect, a method for assembling a camera. The method includes providing an upper housing having a first circuit board and a lower housing having a second circuit board having an image sensor fixed thereon. The first circuit board includes a first blind mate connector on a lower surface thereof. The method further includes providing a second blind mate connector. The lower housing is moved toward the upper housing to a first connected state in which the lower housing is supported by the upper housing and first and second blind mate connectors are partially coupled. The lower housing is further moved toward the upper housing to a second connected state in which the first and second blind mate connectors are fully coupled.

The invention provides, in another aspect, a camera assembly. An upper housing supports a first circuit board having an upper surface and a lower surface opposite the upper surface. A lower housing supports a second circuit board having an image sensor fixed thereon. A first blind mate connector is electrically coupled to the first circuit board and mounted to the lower surface of the first circuit board. A second blind mate connector is electrically coupled to the second circuit board. The lower housing is configured to translate relative to the upper housing between a first connected state in which the lower housing is supported by the upper housing and the first and second blind mate connectors are partially coupled and a second connected state in which the first and second blind mate connectors are fully coupled.

The invention provides, in yet another aspect, a camera assembly. An upper housing supports a first circuit board having an upper surface and a lower surface opposite the upper surface. A lower housing supports a second circuit board having an image sensor fixed thereon. A first blind mate connector is electrically coupled to the first circuit board and mounted to the lower surface of the first circuit board. A second blind mate connector is electrically coupled to the second circuit board. The lower housing is configured to couple to the upper housing in three distinct positions: an access position, a first connected position, and a second connected position. In the access position, the lower housing is coupled to the upper housing and is configured to rotate relative to the upper housing, In the first connected position, the first and second blind mate connectors are axially aligned and electrically decoupled. In the second connected position, the first and second blind mate connectors are electrically coupled.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
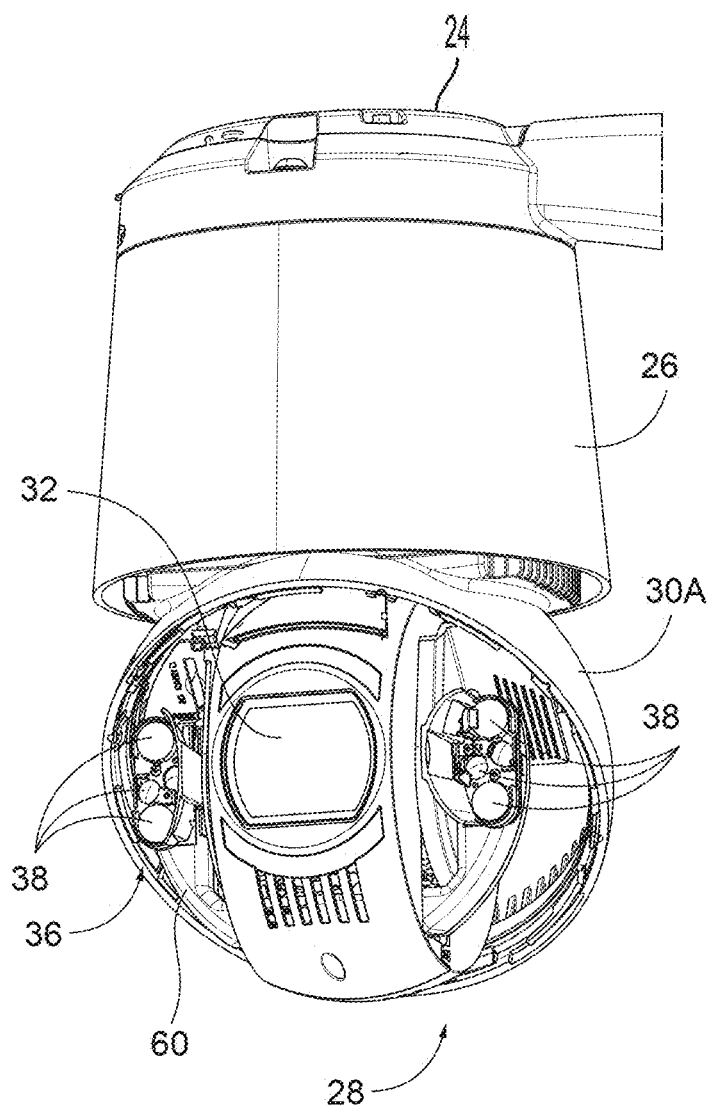
FIG. 1 is a perspective view of a camera assembly having a lower housing and an upper housing.

A surveillance camera assembly 20, as shown in FIG. 1, includes an upper housing 24 and a lower housing 26 having a ball-shaped head portion 28 that depends from the upper housing 24. The upper housing 24 can include one or more mounting features such as an arm 24A and/or a bolting flange 24B adapted for securement to a pole or other fixed structure, e.g., building wall, exterior roof, or interior ceiling. The head portion 28, which is at least partially defined by a translucent dome 30 (FIGS. 2-3), also referred to as a window or a bubble, houses a camera lens module 32 operable to pass imagery of the surrounding area to an image sensor S (FIGS. 7-8) for the creation and collection of still and/or motion surveillance footage. The head portion 28 as shown in FIG. 1 can also include an opaque housing or backing portion 30A joined with the dome 30. In addition to the camera lens module 32, the head portion 28 houses an illuminator module 36 including two separate arrays of lighting elements 38, each array consisting of one or more lighting elements 38 (e.g., LED light sources).

Figure 2:
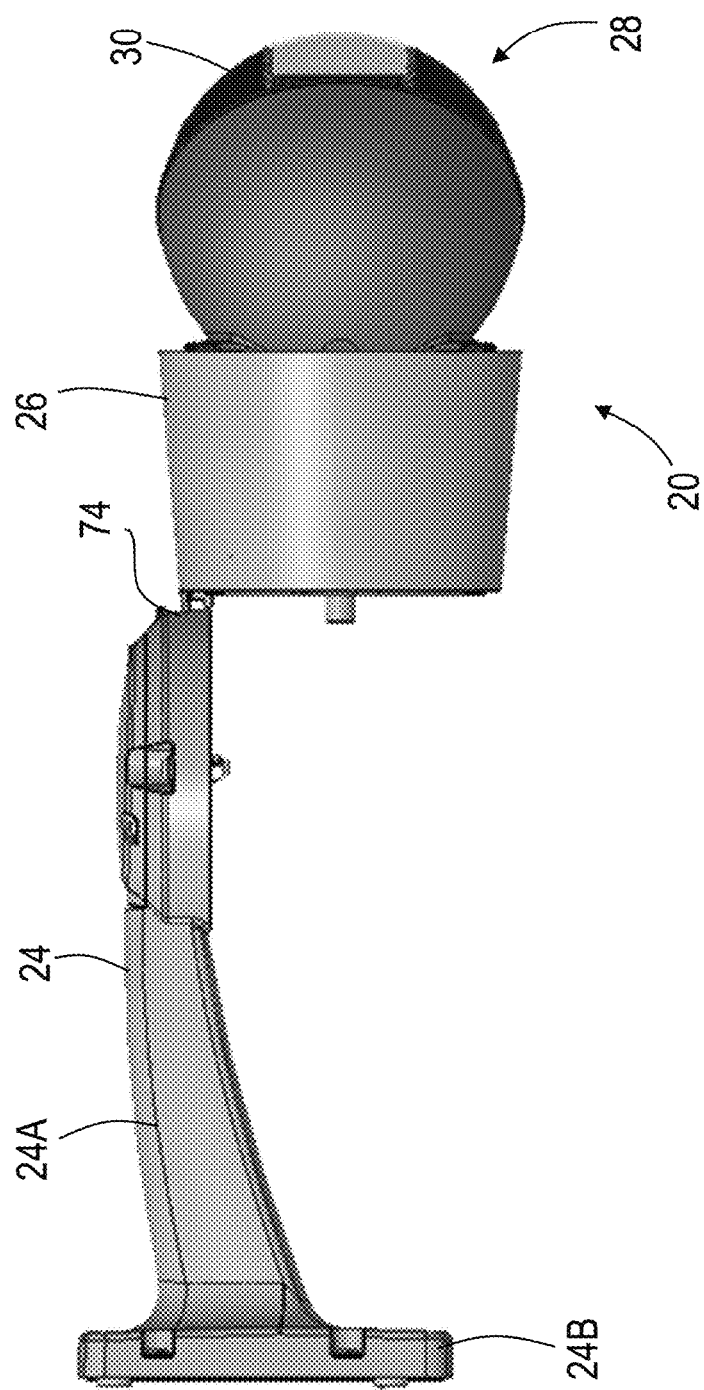
FIG. 2 is a front view of the camera assembly in an access state at a first angle.
Figure 3:
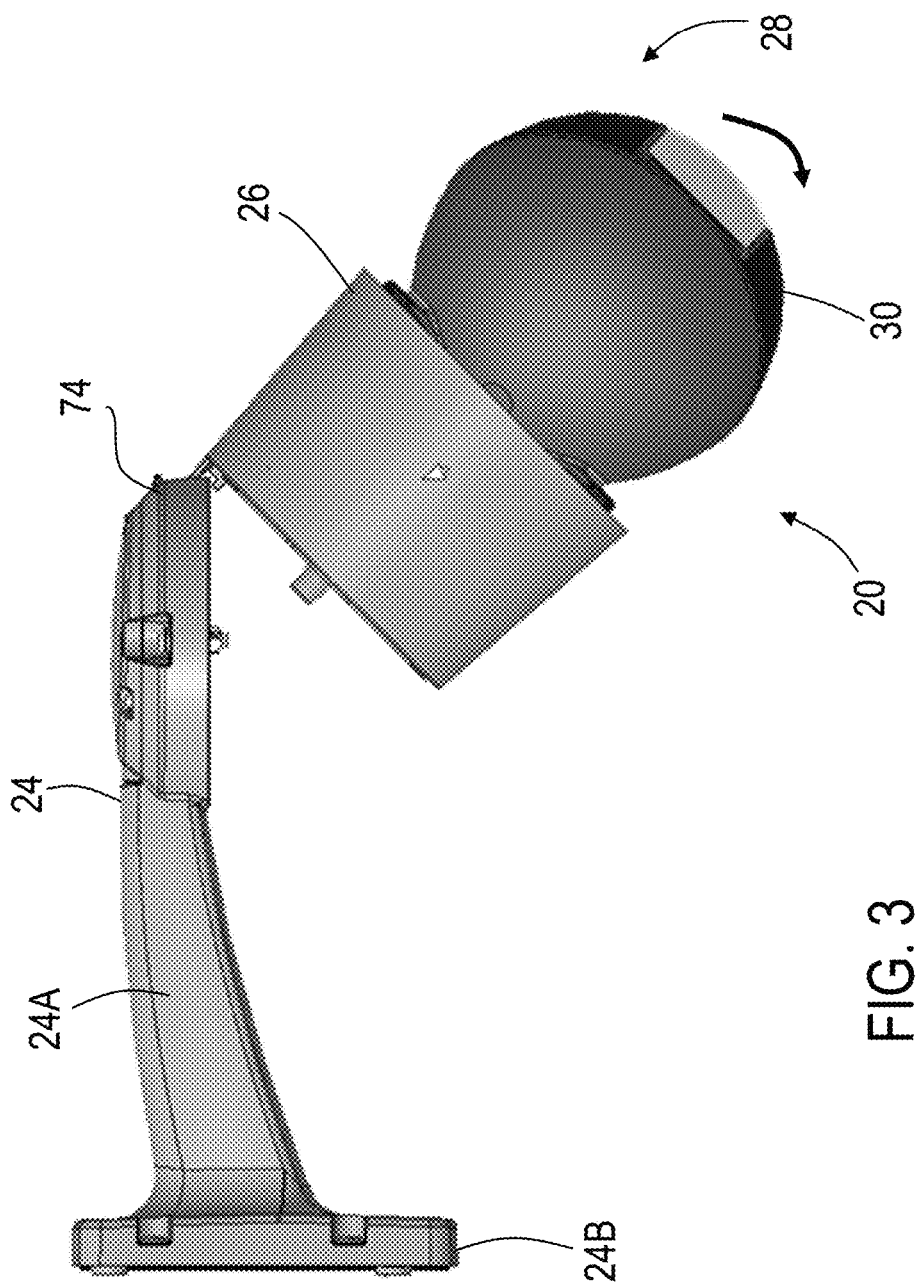
FIG. 3 is a front view of the camera assembly in the access state at a second angle.

The upper housing 24 is coupled to the lower housing 26 and supports the lower housing 26. As shown in FIGS. 2-3, the lower housing 26 is separable from the upper housing 24 to provide access to the circuit boards 42, 44 (FIGS. 7-8) located within the respective housings 24, 26. Providing access to the circuit boards 42, 44 provides for initial assembly of the camera 20 and for repair and component replacement. As shown, the circuit boards 42, 44 are printed circuit boards.

Figure 4:
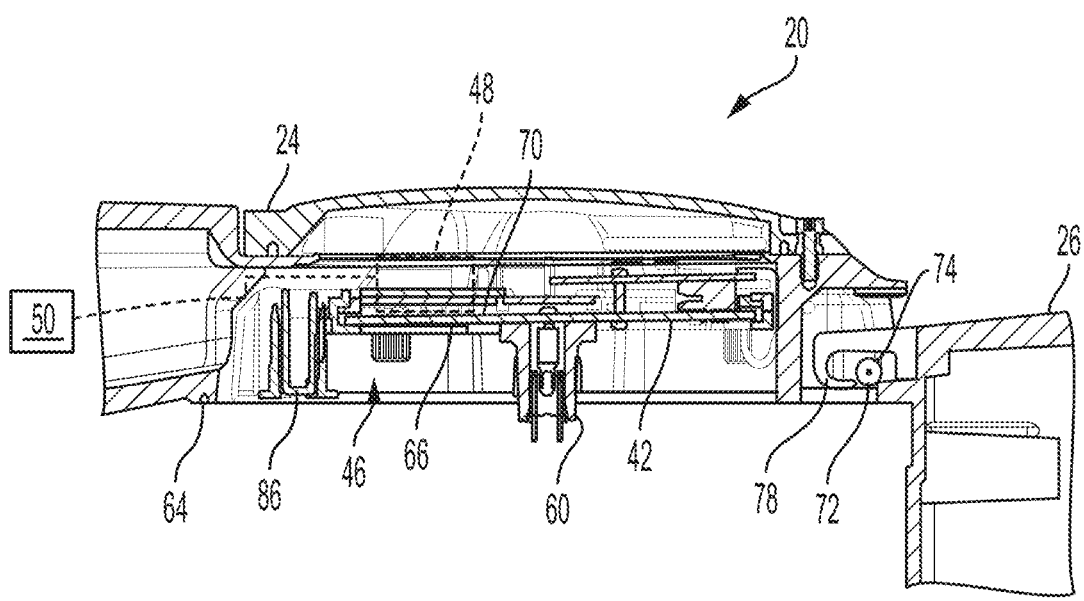
FIG. 4 is a cutaway view illustrating assembly of the lower housing relative to an upper housing toward the access state.

As shown in FIG. 4, the first circuit board 42 is located within a recess 46 of the upper housing 24 and can include various features for working together with the output of the image sensor S. For example, the first circuit board 42 may include elements responsible for power regulation, data storage, and/or data transfer. For wired applications, wires (not shown) may run through the arm 24A of the upper housing 24 to a power source located outside of the surveillance camera assembly 20. As shown, a data transfer module 48 (e.g., Bluetooth, Wi-Fi or other wireless connection, wired connection) is electrically coupled to the first circuit board 42 and transmits data from the image sensor S to a storage device 50 (e.g., server, hard drive) and/or to a display for displaying the image captured by the camera 20.

Figure 7:
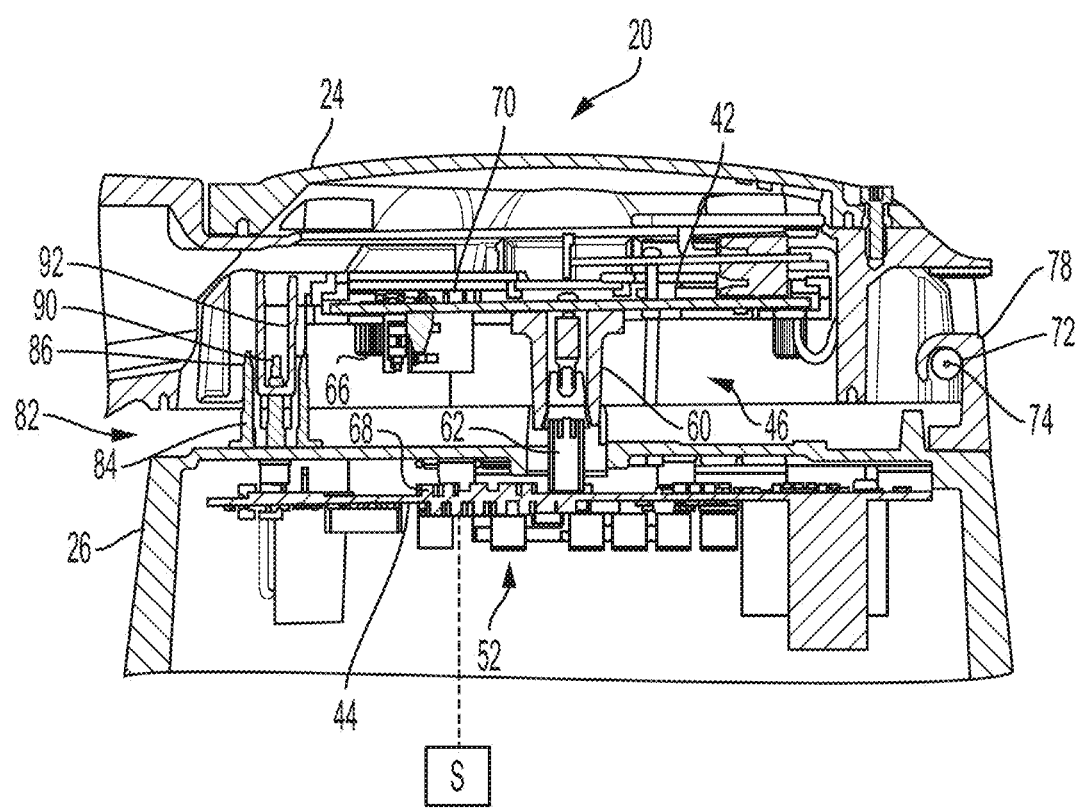
FIG. 7 is a cutaway view illustrating the camera assembly in the first connected state.
Figure 8:
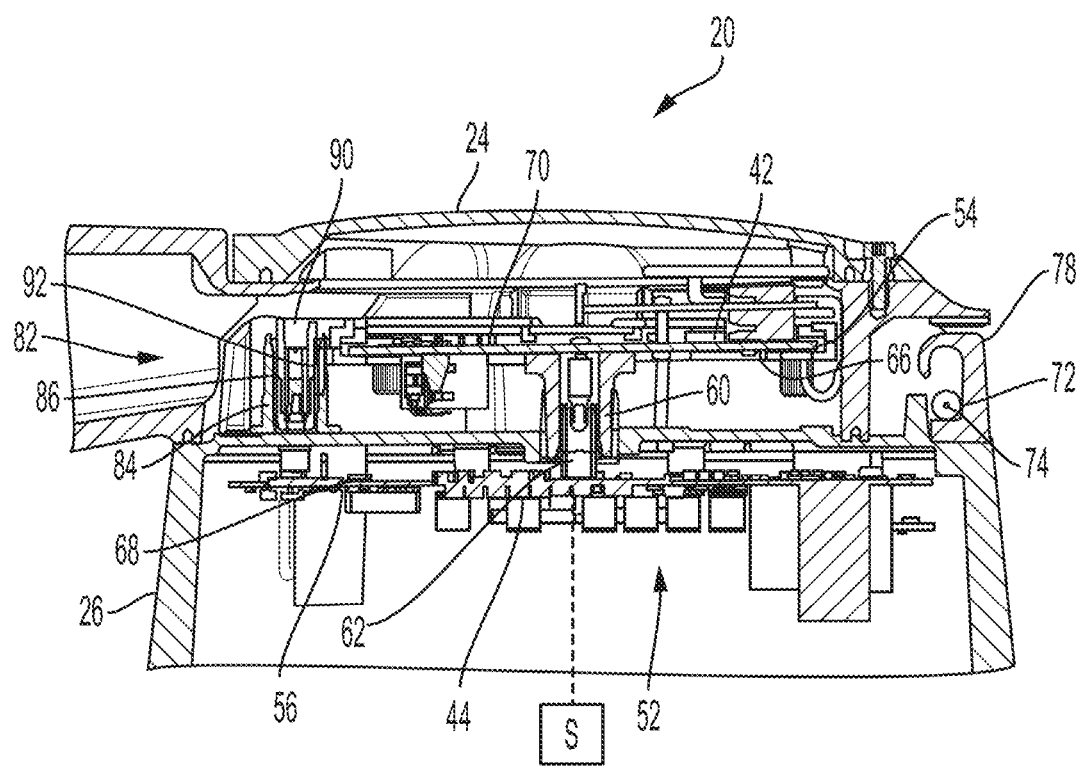
FIG. 8 is a cutaway view illustrating the camera assembly in a second connected state.

As shown in FIGS. 7-8, the second circuit board 44 is electrically coupled to the image sensor S. In some embodiments, the image sensor S is physically mounted on the second circuit board 44, though in other embodiments, the image sensor S may be otherwise electrically coupled to the second circuit board 44 yet physically decoupled therefrom. The second circuit board 44 may be a component of a camera controller 52 that is additionally programmed to facilitate movement of the camera lens module 32 within the dome 30 (e.g., pan, tilt, zoom), control temperature and humidity within the dome 30 (e.g., powering a fan), and control the lighting elements 38, among other functions.

In some embodiments, the first circuit board 42 includes elements (e.g., data transfer, power) that are commonly used with various different camera modules 32 or not specific to the camera module 32. The second circuit board 44 includes elements (e.g., image sensor, temperature sensor, etc.) specific to the particular camera module 32 such that the lower housing 26 (including the second circuit board 44 and the camera lens module located therein) can be replaced with a different lower housing 26, rendering different versions of the camera 20 that both utilize the upper housing 24 and the first circuit board 42.

The first and second circuit boards 42, 44 electrically couple to one another via blind mate connectors 60, 62. The first blind mate connector 60 is coupled to an underside 66 of the first circuit board 42 and extends downward from the first circuit board 42 toward the second circuit board 44. The first circuit board 42 additionally includes a top side 70 opposite the underside 66. The second blind mate connector 62 is coupled to a top side 68 of the second circuit board 44 and extends upward from the second circuit board 44 toward the first circuit board 42. When the lower housing 26 is mounted to the upper housing 24, the blind mate connectors physically connect to one another to create the electrical connection therebetween. As such, the placement of the second blind mate connector 62 within the lower housing 26 is such that it is aligned with the first blind mate connector 60 in the upper housing 24 as discussed in greater detail below with respect to FIGS. 7-8. The blind mate connectors 60, 62 are quick connectors that electrically couple via insertion of one connector 62 (a male connector) into the other connector 60 (a female connector). While the embodiment shown in FIG. 7 illustrates the first blind mate connector 60 as the female connector and the second blind mate connector 62 as the male connector, the arrangement can be switched.

When assembled, as shown in FIG. 8, the first circuit board 42 and the second circuit board 44 are substantially parallel to one another such that the blind mate connectors 60, 62 are positioned at appropriate locations and angles to engage one another. Stated another way, a plane 54 of the first circuit board 42 that extends perpendicular to the thickness of the circuit board 42 is parallel to a plane 56 of the second circuit board 44 that extends perpendicular to the thickness of the second circuit board 44.

With the blind mate connectors 60, 62, the first and second circuit boards 42, 44 are electrically coupled to one another via a simple motion (e.g., translation) of the lower housing 26 relative to the upper housing 24 such that an installer does not need to simultaneously support the two housings 24, 26 and solder or wire the circuit boards 42, 44 to one another, nor perform any other manipulation of fasteners/latches to establish a completed connection between the first and second circuit boards 42, 44.

Figure 5:
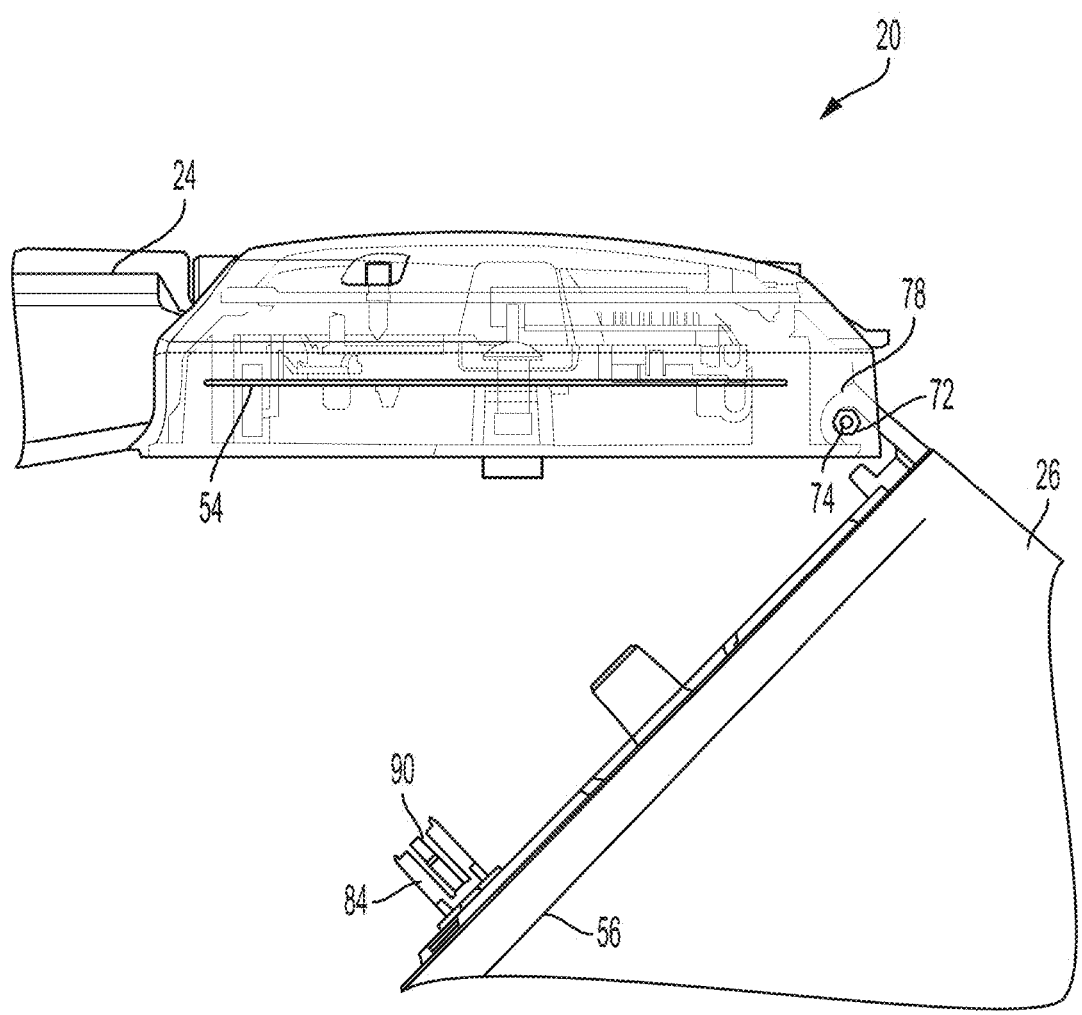
FIG. 5 is a partially hidden view illustrating the camera assembly in the access state.

The camera assembly 20 includes a plurality of features to further facilitate assembly. As shown in FIGS. 4-5, the upper housing 24 includes a hinge pin 72 that defines a rotational axis 74. The lower housing 26 includes a hook 78 that engages the hinge pin 72 by extending around the hinge pin 72. The hook 78 is configured to only engage (or disengage) the hinge pin 72 at a nearly horizontal orientation (rotated ninety degrees from an installed position) as shown in FIG. 2. Geometry of the hook 78 and size of the hinge pin 72 prevent assembly and disassembly in other orientations. The lower housing 26 can then be rotated downward as shown in FIG. 3, to an orientation in which the hook 78 cannot be removed from the hinge pin 42 to prevent accidental decoupling of the hook 78 and hinge pin 72.

With the hook 78 engaging the hinge pin 72, the lower housing 26 is supported by the upper housing 24 and is rotatable relative to the upper housing 24 about the rotational axis 74. Therefore, when the hook 78 engages the hinge pin 72, the lower housing 26 (and the camera lens module 32 mounted therein) is coupled to the upper housing 26 to permit an installer free use of both hands as neither hand is used to support the lower housing 26 relative to the upper housing.

Figure 6:
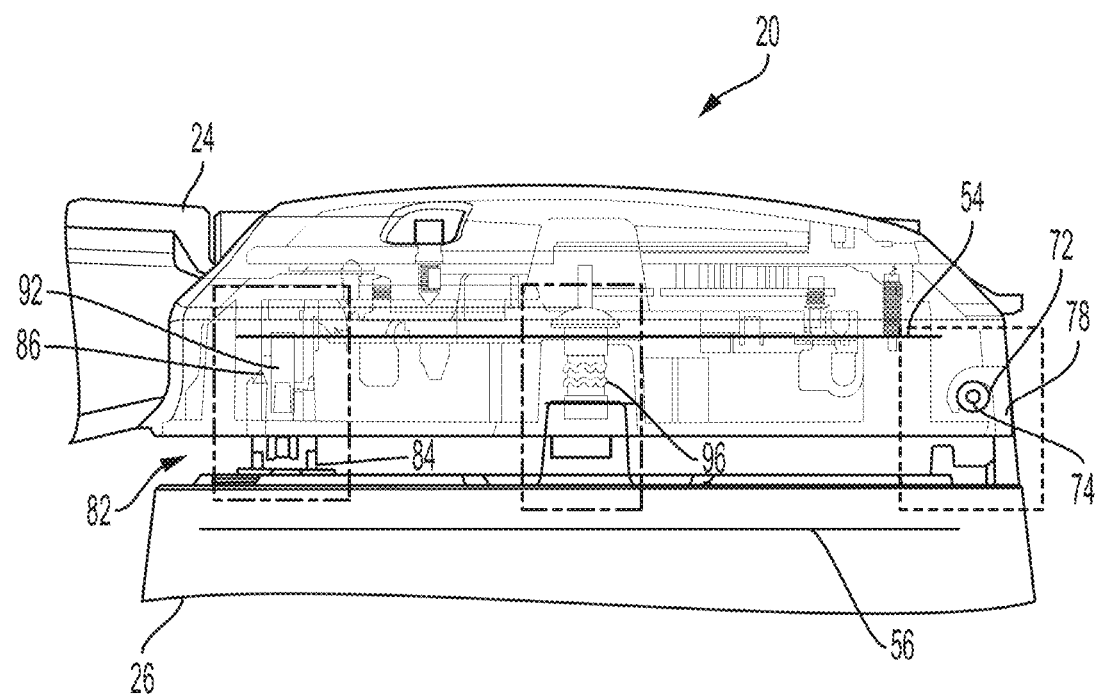
FIG. 6 is a partially hidden view illustrating the camera assembly in a first connected state.

The hinge pin 72 is substantially cylindrical and is arranged relative to the remainder of the upper housing 24 such that the rotational axis 74 defined by the hinge pin 72 extends in a direction that is parallel (or not transverse) to the plane 54 of the first circuit board 42. As such, rotation of the hook 78 about the hinge pin 72 rotates the second circuit board 44 from a dangling, disengaged position in which the plane 56 of the second circuit board 44 is transverse to the plane 54 of the first circuit board 42 (FIG. 5) to an engaged position in which the planes 54, 56 are parallel to one another (FIG. 6).

The camera assembly 20 includes a latching assembly 82 having first and second latching elements 84, 86 operable to cooperate with the hook 78 and hinge pin 72 to hold the upper and lower housings 24, 26 in an aligned position. In the aligned position, the circuit boards 42, 44 extend parallel to one another and the blind mate connectors 60, 62 are aligned with one another such that linear motion of the lower housing 26 relative to the upper housing 24 electrically couples the blind mate connectors 60, 62 to one another. As shown, the latching assembly 82 is a snap-fit buckle. The first latching element 84 extends from the lower housing 26 and is a male buckle member having one or more hooks 90 (as shown, two hooks 90) that engage with the second latching element 86. The second latching element 86 is a female buckle member defining an insertion end or elongated slot 92 that receives the hooks 90 of the first buckle member 84. The hooks 90 are flexible relative to the remainder of the first latching element 84 to compress into the insertion end 92. The elasticity of the hooks 90 allows them to expand outward once inserted into the second latching element 86 to prevent disengagement therebetween.

In some embodiments, the hooks 90 are accessible to be compressed together when located within the second latching element 86 for disassembly of the latching assembly 82.

The camera assembly 20 is not fully assembled when the latching assembly 82 is engaged. More specifically, the blind mate connectors 60, 62 are not electrically coupled to one another such that the first and second circuit boards 42, 44 are not electrically coupled to one another and therefore cannot transfer data or power therebetween. To electrically couple the blind mate connectors 60, 62 to one another, the lower housing 26 is translated upward toward the upper housing 24 until the conductors or pins of the blind mate connectors 60, 62 physically contact one another. A lock 96, such as one or more fasteners can physically couple the upper and lower housings 24, 26 to one another to remove the strain on the blind mate connectors 60, 62 caused by the weight of the lower housing 26. In some embodiments, the lock 96 is a threaded fastener that extends through one housing 24, 26 into the other housing 24, 26. Threading the threaded fastener 96 to couple the housings 24, 26 results in translation of the housings 24, 26 towards one another to electrically couple the blind mate connectors 60, 62. With the hinge pin 72, hook 78, and latching assembly 82 supporting the lower housing 26, the installer can use both hands to screw the lower housing 26 to the upper housing 24.

To facilitate translation of the lower housing 26 relative to the upper housing 24, the hook 78 does not extend below the hinge pin 72 and is elongated to permit travel of the hook 78 upward relative to the hinge pin 72. Likewise, the female buckle member 86 permits linear upward travel of the male buckle member 84.

The upper and lower housings 24, 26 are therefore coupled to one another in various different positions. In each of these positions, the lower housing 26 is supported by the upper housing 26 such that an installer does not need to hold the lower housing 26 relative to the upper housing 24. In a first position, an access position, the lower housing 26 is suspended from the upper housing 24 by hanging the hook 78 from the hinge pin 72. In the access position, the lower housing 26 is capable of rotating about the rotational axis 74 between a number of positions as shown in FIGS. 2-5. In the access position, the underside 66 of the first circuit board 42, the top side 68 of the second circuit board 44, and the blind mate connectors 60, 62 mounted thereon are accessible and may be adjusted, serviced, or wired as needed.

In a second position, a first connected position, as shown in FIGS. 6-7, the hook 78 engages the hinge pin 72 and the lower housing 26 is rotated such that the two halves 84, 86 of the latching assembly 82 are connected. Moving the camera assembly 20 from the access state to the first connected state only includes rotation of the lower housing 26 relative to the upper housing 24. In the first connected state, the lower housing 26 is no longer capable of rotating about the rotational axis 74, as the latching assembly 82 prohibits any such rotation. The blind mate connectors 60, 62 are axially aligned with one another and are coupled to one another by the connections 72, 78, 82 between the housings 24, 26. However, the blind mate connectors 60, 62 are only partially coupled to one another as they are not electrically coupled to one another.

Figure 9:
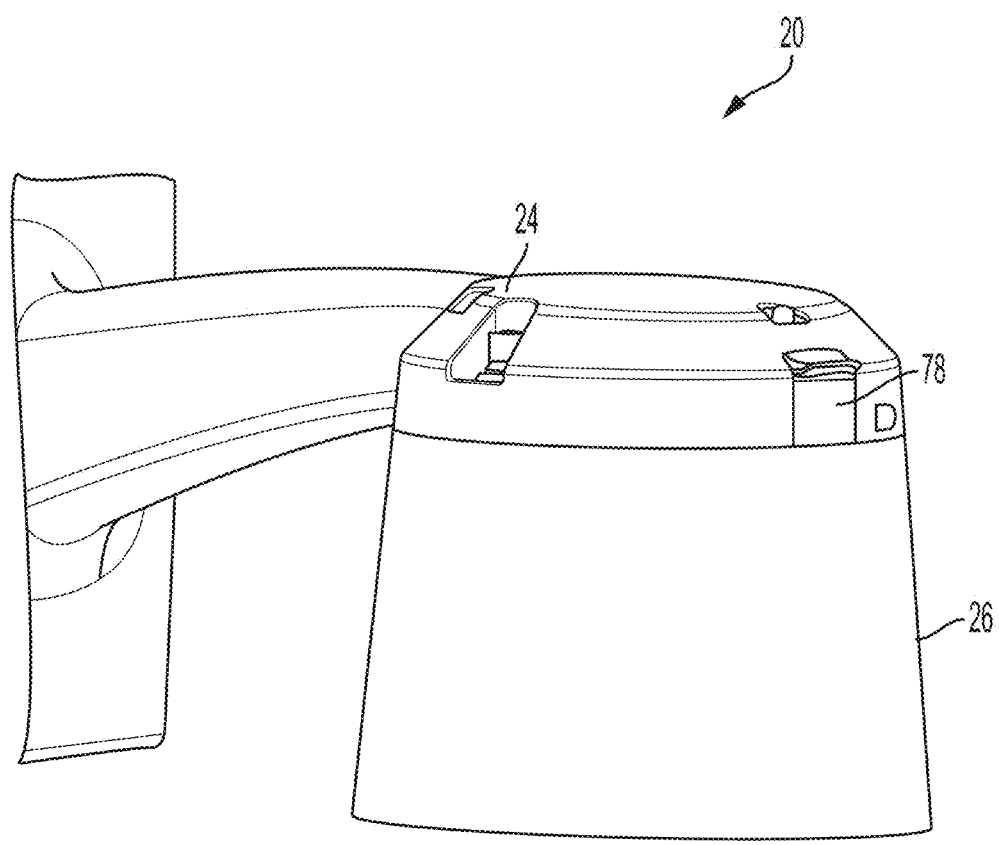
FIG. 9 is a perspective view of the camera assembly in the second connected state.

In a third position, a second connected position, as shown in FIGS. 8 and 9, the hook 78 remains adjacent the hinge pin 72, the two halves 84, 86 of the latching assembly 82 remain engaged with one another, and the lower housing is translated upwards such that the conductors or pins of the blind mate connectors 60, 62 physically contact one another. This translation may be a manual upwards push by the installer (followed by engagement of the lock 96) or may otherwise result from threading the threaded fasteners of the lock 96. In the second connected position, the housings 24, 26 are physically coupled to one another and the blind mate connectors 60, 62 are fully coupled, as they are physically and electrically coupled to one another. As shown, the second blind mate connector 62 extends into the first blind mate connector. Further, the lock 96 is capable of securing the housings 24, 26 directly adjacent to one another, as the two housings 24, 26 are located nearer to one another in the second connected position than in the first connected position. As shown in FIG. 9, in the second connected position, the first and second housings 24, 26 form a smooth interface therebetween and the hook 78 is flush with the first and second housings 24, 26. A seal 64 (FIG. 4) between the first and second housings 24, 26 may be compressed when the lower housing 24 is moved to the second connected position to prevent a weathertight seal therebetween.

An access state is a state in which the camera assembly 20 is in the access position. A first connected state is a state in which the camera assembly 20 is in the first connected position. A second connected state is a state in which the camera assembly 20 is in the second connected position.

In operation, to assemble the camera assembly 20, the upper housing 24 is mounted to a pole or other fixed structure such as a building wall, an exterior roof, or an interior ceiling. The first circuit board 42 is mounted within the upper housing 24 and is electrically coupled to a power source and/or a data storage device 50. The first circuit board 42 is mounted such that the blind mate connector 60 affixed thereto faces out the underside of the upper housing 24 in position to electrically couple to the blind mate connector 62 on the second circuit board 44. The lower housing 26, previously electrically and physically decoupled from the upper housing 24, is coupled to the upper housing 24 by engaging the hook 78 with the hinge pin 72, thereby placing the camera assembly 20 into the access position. The lower housing 26 is then rotated about the hinge pin 72 until the first latching element 84 coupled to the lower housing 26 engages the second latching element 86 coupled to the upper housing 24, thereby placing the camera assembly 20 into the first connected state. The lower housing 26 is then moved upward toward the upper housing 24, constrained to linear motion by the latching assembly 82, until the blind mate connectors 60, 62 physically and electrically couple to one another, thereby providing power and data transfer to the camera lend module 32, illuminator module 36, and other components located within the lower housing 26 and electrically coupled to the second circuit board 44.

Although the invention has been described in detail with reference to certain preferred embodiments, variations and modifications exist within the scope and spirit of one or more independent aspects of the invention as described.

What is claimed is:

1. A method for assembling a camera, the method comprising:

providing an upper housing having a first circuit board and a lower housing having a second circuit board having an image sensor fixed thereon, the first circuit board including a first blind mate connector on a lower surface thereof;

providing a second blind mate connector;

moving the lower housing toward the upper housing to a first connected state in which the lower housing is supported by the upper housing and the first and second blind mate connectors are partially coupled; and further moving the lower housing toward the upper housing to a second connected state in which the first and second blind mate connectors are fully coupled,
wherein the first and second blind mate connectors are electrically decoupled in the first connected state, and wherein the first and second blind mate connectors are electrically coupled in the second connected state.

2. The method of claim 1, wherein the second blind mate connector is electrically coupled to the image sensor such that the image sensor is electrically coupled to the first circuit board via the first and second blind mate connectors in the second connected state.

3. The method of claim 1, further comprising locating a hook of a latching assembly within an elongated slot of the latching assembly to restrict movement of the lower housing relative to the upper housing to linear translation when transitioning from the first connected state to the second connected state.

4. The method of claim 1, further comprising:
coupling the upper housing to the lower housing about a rotational axis; and
providing a first latching element on the upper housing and a second latching element on the lower housing,
wherein moving the lower housing toward the upper housing to the first connected state includes rotating the lower housing relative to the upper housing about the rotational axis to engage the first latching element with the second latching element.

5. The method of claim 4, wherein coupling the upper housing to the lower housing about the rotational axis includes extending a hook of the lower housing about a hinge pin of the upper housing.

6. The method of claim 5, wherein the hook extends about the hinge pin when rotating the lower housing relative to the upper housing about the rotational axis to engage the first latching element with the second latching element, and wherein the hook is adjacent to the hinge pin when moving the lower housing toward the upper housing to the second connected state.

7. The method of claim 1, wherein the first and second blind mate connectors are axially aligned in the first connected stated.

8. The method of claim 1, further comprising:
securing the lower housing to the upper housing in the second connected state via a lock distinct from the first and second blind mate connectors.

9. A camera assembly comprising:
an upper housing supporting a first circuit board having an upper surface and a lower surface opposite the upper surface;
a lower housing supporting a second circuit board having an image sensor fixed thereon;
a first blind mate connector electrically coupled to the first circuit board and mounted to the lower surface of the first circuit board; and
a second blind mate connector electrically coupled to the second circuit board;
wherein the lower housing is configured to translate relative to the upper housing between a first connected state in which the lower housing is supported by the upper housing and the first and second blind mate connectors are axially aligned and a second connected state in which the first and second blind mate connectors are fully coupled.

10. The camera assembly of claim 9, wherein the second blind mate connector is electrically coupled to the image sensor such that the image sensor is electrically coupled to the first circuit board via the first and second blind mate connectors in the second connected state.

11. The camera assembly of claim 9, wherein the lower housing is restricted to linear translation between the first connected state and the second connected state.

12. The camera assembly of claim 9, further comprising a first latching element coupled to the upper housing and a second latching element coupled to the lower housing and configured to engage the first latching element in the first connected state, wherein the lower housing is coupled to the upper housing about a rotational axis, wherein the lower housing is selectively rotatable relative to the upper housing about the rotational axis, and wherein engagement of the first and second latching elements prohibits rotation of the lower housing relative to the upper housing about the rotational axis.

13. The camera assembly of claim 12, further comprising a hook coupled to the lower housing and a hinge pin coupled to the upper housing, wherein the hook is rotatable about the hinge pin such that the lower housing is selectively rotatable relative to the upper housing.

14. The camera assembly of claim 13, wherein, in the first connected state, the hook is supported by the hinge pin and the second latching element is supported by the first latching element such that the first blind mate connector is axially aligned with the second blind mate connector.

15. The camera assembly of claim 12, wherein the first latching element is engaged with the second latching element in the first connected position and in the second connected position.

16. The camera assembly of claim 9, wherein the first and second blind mate connectors are electrically decoupled in the first connected state, and wherein the first and second blind mate connectors are electrically coupled in the second connected state.

17. The camera assembly of claim 9, further comprising a lock distinct from the first and second blind mate connectors, wherein the lock is configured to secure the lower housing to the upper housing in the second connected state.

18. The camera assembly of claim 9, wherein the first circuit board includes a data transfer module programmed to transfer data from the image sensor to a storage device via the first and second blind mate connectors.

19. A camera assembly comprising:
an upper housing supporting a first circuit board having an upper surface and a lower surface opposite the upper surface;
a lower housing supporting a second circuit board having an image sensor fixed thereon;
a first blind mate connector electrically coupled to the first circuit board and mounted to the lower surface of the first circuit board; and
a second blind mate connector electrically coupled to the second circuit board;
wherein the lower housing is configured to couple to the upper housing in three distinct positions: an access position, a first connected position, and a second connected position;
wherein, in the access position, the lower housing is coupled to the upper housing and is configured to rotate relative to the upper housing,
wherein, in the first connected position, the first and second blind mate connectors are axially aligned and electrically decoupled; and
wherein, in the second connected position, the first and second blind mate connectors are electrically coupled.

20. The camera assembly of claim 19, wherein the lower housing is configured to rotate from the access position to the first connected position, and wherein the lower housing is configured to translate linearly from the first connected position to the second connected position.

\* \* \* \* \*